United States Patent
Nishida et al.

(10) Patent No.: US 9,316,851 B2
(45) Date of Patent: Apr. 19, 2016

(54) LIQUID CRYSTAL DISPLAY DEVICE OF LATERAL ELECTRIC FIELD TYPE CAPABLE OF REDUCING WIDTH OF BLACK MATRIX

(71) Applicant: NLT Technologies, Ltd., Kanagawa (JP)

(72) Inventors: Shinichi Nishida, Kanagawa (JP);
Naoyuki Taguchi, Kanagawa (JP);
Takahiko Watanabe, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 401 days.

(21) Appl. No.: 13/803,668

(22) Filed: Mar. 14, 2013

(65) Prior Publication Data

US 2013/0242221 A1  Sep. 19, 2013

(30) Foreign Application Priority Data

Mar. 14, 2012 (JP) ................. 2012-058038

(51) Int. Cl.
*G02F 1/136* (2006.01)
*G02F 1/1343* (2006.01)
(Continued)

(52) U.S. Cl.
CPC ........ *G02F 1/1323* (2013.01); *G02F 1/133512* (2013.01); *G02F 1/134363* (2013.01); *G02F 2001/134318* (2013.01); *G02F 2001/136218* (2013.01)

(58) Field of Classification Search
CPC ............ G02F 1/1368; G02F 1/136227; G02F 1/136286; G02F 1/133707; G02F 1/136213; G02F 1/134336; G02F 1/1393; G02F 1/13394; G02F 1/13392; G02F 1/133512; H01L 27/1214; H01L 27/12
USPC ..................... 349/43, 141, 146, 155
See application file for complete search history.

(56) References Cited

U.S. PATENT DOCUMENTS 6,927,808 B2  8/2005  Ono et al.
7,009,206 B2  3/2006  Lee et al.
(Continued)

FOREIGN PATENT DOCUMENTS

JP   2004-12730    1/2004
JP   2004-46123    2/2004
(Continued)

OTHER PUBLICATIONS

Japanese Office Action dated Oct. 13, 2015 in corresponding Japanese Patent Application No. 2012-058038 with English translation of Japanese Office Action.

*Primary Examiner* — Mike Qi
(74) *Attorney, Agent, or Firm* — Young & Thompson

(57) ABSTRACT

A liquid crystal display device of a lateral electric field type performs display by rotating homogeneous-aligned liquid crystals by a lateral electric field substantially parallel to a substrate, which is applied across a pixel electrode and a common electrode, to increase the aperture ratio of a liquid crystal panel by narrowing the width of a black matrix provided along a data line. A source pixel electrode connected to a source electrode extends along the data line, a storage capacitance electrode formed by the same layer as the data line overlaps an adjacent scan line, the source pixel electrode is disposed so as to be connected to the storage capacitance electrode and a pixel along one side, an interlayer film is formed on the source pixel electrode, and a pixel electrode and a common electrode formed by a transparent conductive film are formed on the interlayer film.

9 Claims, 17 Drawing Sheets

(51) Int. Cl.
*G02F 1/1339* (2006.01)
*G02F 1/13* (2006.01)
*G02F 1/1335* (2006.01)
*G02F 1/1362* (2006.01)

(56) References Cited

U.S. PATENT DOCUMENTS

| | | | |
|---|---|---|---|
| 7,211,827 | B2 | 5/2007 | Lee et al. |
| 7,327,427 | B2 | 2/2008 | Oke et al. |
| 7,667,807 | B2 | 2/2010 | Nishida |
| 8,228,478 | B2 | 7/2012 | Maede et al. |
| 8,358,392 | B2 * | 1/2013 | Suzuki et al. .......... 349/141 |
| 8,743,330 | B2 | 6/2014 | Maede et al. |
| 2003/0227580 | A1 | 12/2003 | Ono et al. |
| 2004/0174482 | A1 | 9/2004 | Oke et al. |
| 2004/0238823 | A1 | 12/2004 | Lee et al. |
| 2007/0024791 | A1 | 2/2007 | Nishida |
| 2008/0036930 | A1 * | 2/2008 | Konno et al. .......... 349/33 |
| 2009/0237342 | A1 | 9/2009 | Maede et al. |
| 2011/0176100 | A1 * | 7/2011 | Nishida et al. .......... 349/143 |

FOREIGN PATENT DOCUMENTS

| | | |
|---|---|---|
| JP | 2004-271784 | 9/2004 |
| JP | 2004-361949 | 12/2004 |
| JP | 2007-34218 | 2/2007 |
| JP | 2009-103925 | 5/2009 |
| JP | 2009-223245 | 10/2009 |
| JP | 2011-150021 | 8/2011 |

* cited by examiner

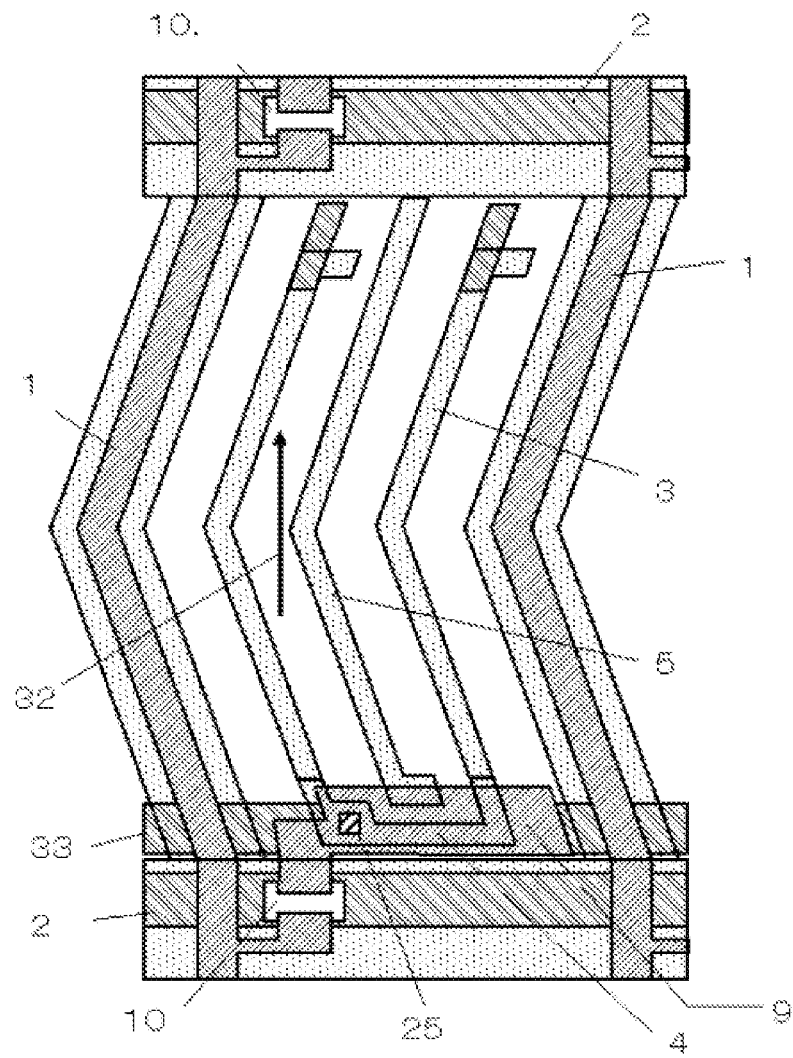
(Prior Art)

LIQUID CRYSTAL DISPLAY DEVICE OF LATERAL ELECTRIC FIELD TYPE CAPABLE OF REDUCING WIDTH OF BLACK MATRIX

TECHNICAL FIELD

The present invention relates to a liquid crystal display device and, more particularly, to an active-matrix-type liquid crystal display device of a lateral electric field type having high aperture ratio.

BACKGROUND ART

A liquid crystal display device of a TN (Twisted Nematic) type being widely used has high contrast but, on the other hand, has a problem of high visual angle dependence since the molecular axis of the liquid crystal rises due to the vertical electric field. Since demand for a large-sized monitor of a TV or the like is increasing in recent years, a so-called lateral-electric-field-type liquid crystal panel such as the IPS (In-Plane Switching) type or FFS type is being spread, in which an electric field substantially parallel to a substrate for which thin film transistors (hereinafter, called TFTs) are provided is applied to liquid crystal molecules to drive the molecules. A lateral-electric-field-type liquid crystal display panel of, for example, the IPS type has a plurality of pixel electrodes substantially parallel to data line or scan lines on a substrate, and a common electrode which is paired with the pixel electrode. By an electric field substantially parallel to the substrate formed between the pixel electrodes and the common electrode, the liquid crystal molecules are turned in a plane parallel to the substrate, thereby controlling display. By driving the liquid crystal molecules in this manner, the visual angle dependency with respect to the rise angle of the molecular axis is eliminated. The visual angle characteristic is more advantageous as compared with that of the TN type.

Although the IPS type has the visual angle characteristic which is more advantageous than that of the TN type as described above, it has a following problem. Since pixel electrodes and a common electrode are disposed in a comb shape and a lateral electric field is applied, the ratio of the electrode area in a display region is high, and it is difficult to obtain high aperture ratio. To address the problem, there is a technique disclosed in patent literature 1 as means to increase the aperture ratio. FIG. 16 illustrates a pixel structure disclosed in the patent literature 1. In the conventional pixel illustrated in FIG. 16, pixel electrodes and a common electrode extend in a comb-teeth shape in the extension direction of a data line, a second part for coupling the pixel electrodes is formed, and a common signal line overlaps the second part to form storage capacitance by the part, thereby obtaining high aperture ratio.

Another way to increase the aperture ratio may be to reduce a black matrix. For example, in the invention disclosed in patent literature 2, a light shield electrode provided along a signal line is provided below the signal line, and the region between the signal line and the light shield electrode is covered with a black matrix. The width of the black matrix exerting direct influence on the aperture ratio depends on the interval between the light shield electrode and the signal line. Consequently, the interval between the light shield electrode and the signal line cannot be set to a predetermined interval or less to prevent unpreferable generation of capacitance. There is a problem such that the width of the black matrix is not easily decreased.

Patent Literature 1: Japanese Unexamined Patent Application Publication No. 2011-150021
Patent Literature 2: Japanese Unexamined Patent Application Publication No. 2009-103925

SUMMARY OF THE INVENTION

The present invention has been made in consideration of the above circumstances and an object of the invention is to provide a liquid crystal panel in which the width of a black matrix provided along a data line is easy to be reduced.

To solve the problem, the present invention provides a liquid crystal display device of a lateral electric field type performing display by rotating horizontal-aligned liquid crystals by a lateral electric field which is applied across a pixel electrode and a common electrode and is substantially parallel to a substrate, including: a first substrate having a plurality of data lines disposed in parallel and a plurality of scan lines disposed substantially perpendicular to the data lines and in parallel to one another, and having thin film transistors corresponding to respective sub pixel regions aligned in a matrix surrounded by the data lines and the scan lines and disposed near intersections between the data lines and the scan lines; a second substrate opposed to the first substrate via a liquid crystal layer; an electric potential supply line extending along the data line in the sub pixel region and connected to a source electrode of the thin film transistor; a pixel electrode disposed in a layer upper than the electric potential supply line in the sub pixel region and connected to the electric potential supply line; a common electrode formed by a transparent conductive layer having a common electrode first part and a common electrode second part, the common electrode first part being formed in a linear pattern substantially parallel to the scan line and apart from the pixel electrode by predetermined distance, and the common electrode second part being formed continued to the first part so as to cover the data line and a separation region between the data line and the electric potential supply line; and a black matrix formed on the second substrate and disposed so as to cover the separation region.

In the above-described configuration, an electric field which drives the liquid crystal is generated between the first part of the common electrode and the pixel electrode. For example, the pixel electrode may have a plurality of electrodes disposed so as to be paired with the first part of the common electrode and apart only by the same distance to generate an electric field parallel to the substrate, or may be disposed so as to extend in a plane to generate a fringe electric field between the first part of the common electrode and the pixel electrode.

The present invention also provides a liquid crystal display device of a lateral electric field type performing display by rotating horizontal-aligned liquid crystals by a lateral electric field which is applied across a pixel electrode and a common electrode and is substantially parallel to a substrate, including: a first substrate having a plurality of data lines disposed in parallel and a plurality of scan lines disposed substantially perpendicular to the data lines and in parallel to one another, and having thin film transistors corresponding to respective sub pixels aligned in a matrix surrounded by the data lines and the scan lines and disposed near intersections between the data lines and the scan lines; a second substrate opposed to the first substrate via a liquid crystal layer; an electric potential supply line extending along the data line in the sub pixel region and connected to a source electrode of the thin film transistor; a pixel electrode in which a common electrode formed in a plane shape is disposed in a layer upper than the electric potential supply line in the sub pixel region and covers the data line and a separation region between the electric potential supply line and the data line, and which has a first part disposed in a layer upper than the common electrode and formed linearly so as to generate an electric field substantially parallel to the substrate between the common electrode and itself, and a second part continued to the first part and connected to the electric potential supply line via an opening formed in the common electrode; and a black matrix formed on the second substrate and disposed so as to cover the separation region.

In such configuration, the fringe electric field is generated between the common electrode and the first part of the pixel electrode to drive the liquid crystal molecules.

With the above-described configuration of the present invention, the electric potential supply line extends along the data line in the sub pixel region and is connected to the source electrode of the thin film transistor, the pixel electrode disposed in a layer upper than the electric potential supply line in the sub pixel region and connected to the electric potential supply line exists, the common electrode is formed by a transparent conductive layer having a first part formed in a linear pattern substantially parallel to the scan line and apart from the pixel electrode only by predetermined distance, and a second part formed continued substantially perpendicular to the first part so as to cover a separation region between the data line and the electric potential supply line, and the black matrix is formed on the second substrate opposed to the first substrate and disposed on the upper side of the separation region.

Since the separation region between the data line and the electric potential supply line is covered with the second part of the common electrode, the electric field of the region is shielded so that the electric field is not applied to the liquid crystal in the path of light passing through the region. In the lateral electric field type, the initial alignment state is a normally black state. Consequently, since light hardly passes through the region, the width of the black matrix can be increased more than that in the conventional one. Accordingly, the aperture ratio can be increased.

With the above-described another configuration of the present invention, the electric potential supply line extends along the data line in the sub pixel region and is connected to the source electrode of the thin film transistor, the common electrode formed in a plane shape is disposed in a layer upper than the electric potential supply line in the sub pixel region and covers the data line and a separation region between the electric potential supply line and the data line. The pixel electrode has a plurality of first parts disposed substantially parallel to one another above the common layer and generating an electric field substantially parallel to the substrate between the common electrode and themselves, and a second part continued to the first part and connected to the electric potential supply line via an opening formed in the common electrode. The black matrix is formed on the second substrate and disposed so as to cover the separation region.

Since the separation region between the data line and the electric potential supply line is covered with the second part of the common electrode, the electric field of the region is shielded so that the electric field is not applied to the liquid crystal in the path of light passing through the region. In the lateral electric field type, the initial alignment state is a normally black state. Consequently, since light hardly passes through the region, the width of the black matrix can be increased more than that in the conventional one. Accordingly, the aperture ratio can be increased.

BRIEF DESCRIPTION OF THE DRAWINGS

FIG. 16 is a plan view of a conventional liquid crystal display device.

DESCRIPTION OF PREFERRED EMBODIMENTS OF THE INVENTION

Hereinafter, embodiments of the present invention will be described.

First Embodiment

Figure 1:
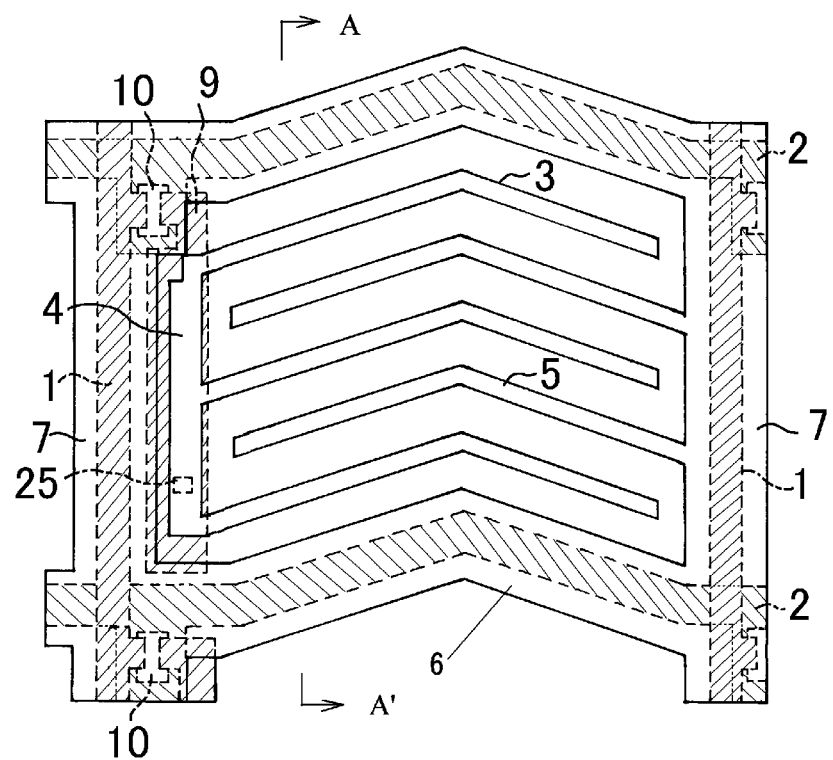
FIG. 1 is a plan view, viewed from a direction perpendicular to a substrate, of a TFT substrate of a first embodiment of the present invention, in which a common signal line is not disposed in a sub pixel.
Figure 2A:
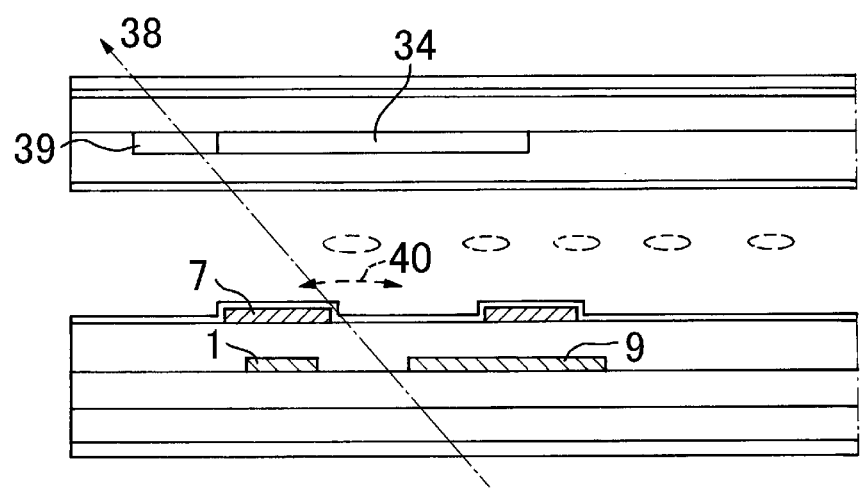
FIG. 2A is an explanatory diagram illustrating light leakage in an oblique visual field, which occurs when a region between a data line and a source pixel electrode is not shielded in the present invention.
Figure 2B:
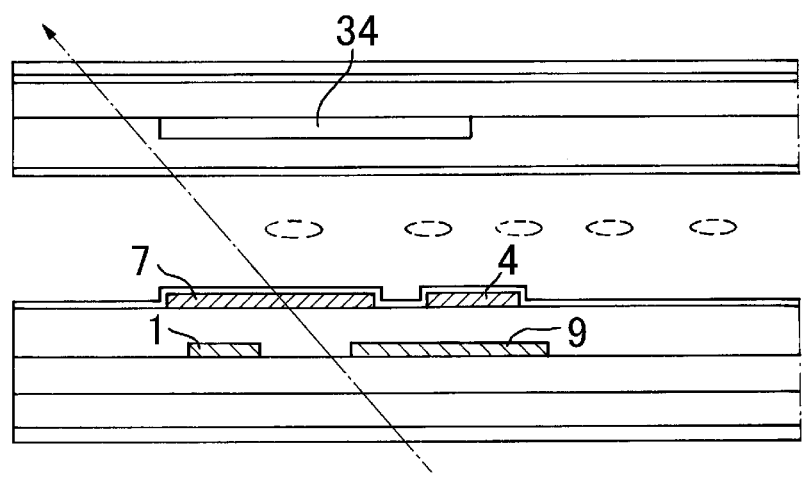
FIG. 2B is a cross section of the TFT substrate of the invention illustrated in FIG. 1, taken along a plane perpendicular to the extension direction of the data line, in which the region between the data line and the source pixel electrode is shielded by a common electrode.
Figure 3:
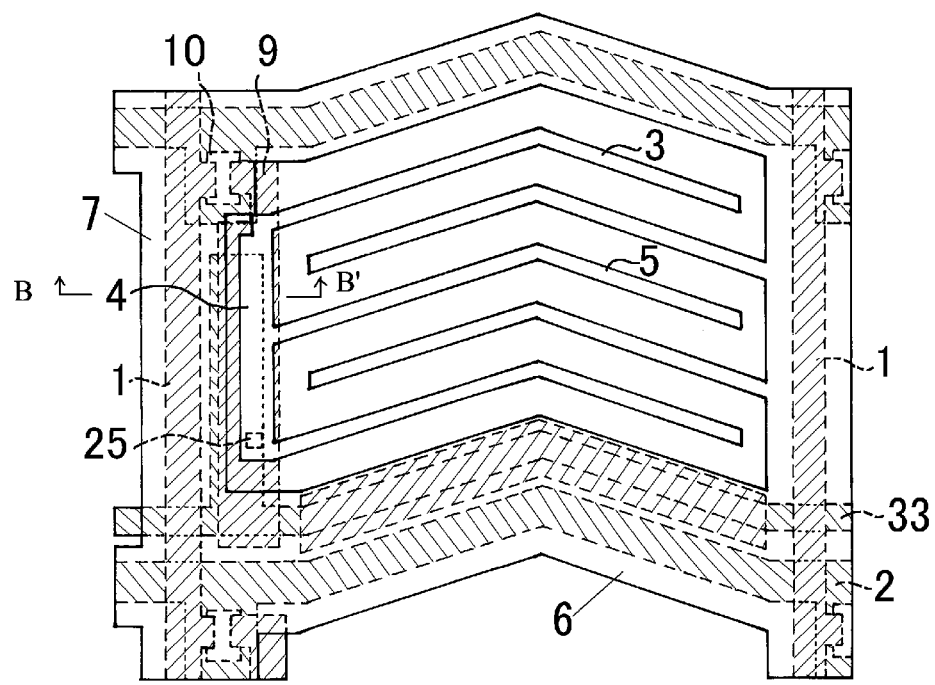
FIG. 3 is a plan view of a TFT substrate, viewed from a direction perpendicular to a substrate, having a common signal line which is substantially parallel to a scan line, as another mode of the present invention.
Figure 4:
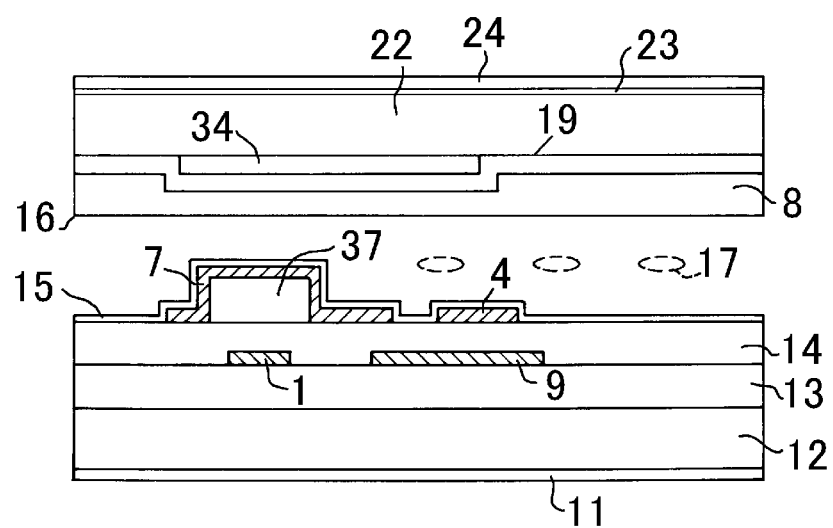
FIG. 4 is a cross section of a data line of a TFT substrate, taken along a plane substantially perpendicular to the extension direction of the data line, in which an organic film is provided between a common electrode and an insulating film, as another mode of the present invention.

A first embodiment of the present invention will be described with reference to FIGS. 1, 2A, 2B, 3, and 4. FIG. 1 is a plan view illustrating the configuration of a pixel in a liquid crystal display device in the first embodiment of the present invention. FIGS. 2A and 2B are cross sections taken along line A-A' of FIG. 1. FIG. 3 is a plan view illustrating the case where a common signal line is disposed along scan lines in the first embodiment of FIG. 1. FIG. 4 is a cross section taken along line B-B' of FIG. 3.

As illustrated in FIG. 1, in the liquid crystal display device, a transparent substrate (first substrate), that is, a polarizer 11, a first transparent insulating substrate (glass substrate) 12, and a gate insulating film 13 are stacked in this order, and a plurality of data lines 1 are disposed in parallel to one another. A plurality of scan lines 2 are disposed substantially perpendicular to the data lines 1, and a plurality of sub pixel region disposed on a matrix formed by the plurality of data lines 1 and the scan lines 2 are defined.

A gate electrode is provided on the scan line 2 near a part crossing the data line 1, and the drain electrode is connected to the data line 1 crossing the scan line 2. A thin film transistor (hereinafter, called TFT) can be formed near the crossing part of the data line 1 and the scan line 2.

On one of the sides of the data line 1, a source pixel electrode 9 (an electric potential supply line connected to the source electrode) is disposed along the data line 1 and connected to pixel electrodes 3 and 4 which will be described later.

A protection insulating film 14 is stacked on the source pixel electrode 9, and pixel electrodes 3 and 4 are disposed on the protection insulating film 14 and formed by coupling one side of each of a plurality of linear electrodes like a comb shape. For example, the pixel electrode is constructed by a plurality of first parts 3 (first parts of a pixel electrode) parallel to the scan lines, and a second part 4 (a second part of the pixel electrode) continued to the first parts 3 and parallel to the data line 1.

In correspondence to the shape of the pixel electrode, a common electrode also has a plurality of first parts 5 (first parts of the common electrode) substantially parallel to the scan lines. The first parts 5 of the common electrode and the first parts 3 of the pixel electrode are disposed at predetermined intervals and can generate a lateral electric field substantially parallel to the substrate.

FIG. 2B is a cross section of the data line, the source pixel electrode, and the pixel electrode, taken along a plane substantially perpendicular to the extending direction of the data line.

As illustrated in FIG. 2B, on the side of the data line 1, the source pixel electrode 9 is disposed in parallel with predetermined gap from the data line 1 within the sub pixel, and the first part of the pixel electrode is disposed above the source pixel electrode 9 via the protection insulating film 14. The protection insulating film 14 is covered with an alignment film 15. Above the alignment film 15, a liquid crystal 17 is disposed on the first substrate side. Above the first substrate, the liquid crystal 17 is disposed. Above the liquid crystal 17, an alignment film 16 as an opposed substrate (second substrate) and an overlayer coat 18 are disposed. On a part of the overcoat layer 18, a black matrix 34 is disposed. On the overcoat layer 18 and the black matrix 34, a second insulating substrate (glass substrate) 22, an ITO film 23, and a polarizer 24 are stacked.

A separation region is formed between the data line 1 and the source pixel electrode 9, and a second part 7 of the common electrode is formed above the data line 1 and the separation region. The width of the second part 7 of the common electrode is at least equal to the separation distance between the data line and the source pixel electrode 9 or larger. Since the data line and the separation region between the data line and the electric potential supply line are covered with the second part of the common electrode, the electric field of the region is shielded. Consequently, the electric field of the region is shielded, so that the electric field is not applied to the liquid crystal in the path of light passing the region. In the lateral electric field type, the region is normally black in an initial alignment state, so that light does not pass through the region.

For example, one end in the width direction of the black matrix 34 may be positioned above the data line and the other end may be positioned above the source pixel electrode.

In the case where the region between the data line 1 and the source pixel electrode 9 is not shielded, as illustrated in FIG. 2A, the liquid crystal is turned by an electric field 40 applied across the data line 1 or the common electrode shielding the data line 1 and the source pixel electrode 9. In this case where this part is seen from an oblique visual field 38 from the side opposite to the source pixel electrode 9 while sandwiching the data line 1, it is regarded as light leakage. To prevent it, the black matrix 34 has to be widened only by the amount of 39 in this direction in consideration of a deviation between the array substrate and the color filter substrate, and it deteriorates the aperture ratio.

In the case where the data line 1 is not shielded, leakage of the electric field occurs on the side where the data line is not covered with the common electrode, the liquid crystal rotates, and light leakage occurs.

On the other hand, by shielding the data line 1 and the region between the data line 1 and the source pixel electrode 9 like in the first embodiment of the invention, no electric field is applied to the liquid crystal in the optical path of the oblique visual field 38 as illustrated in FIG. 2B, so that no light leakage occurs. Consequently, it is sufficient to provide the black matrix only by an amount to cover the separation region between the data line 1 and the source pixel electrode 9 and the pillar spacer along the data line 1.

As described above, by applying the first invention of the present application, the electric field of the region in the path of the light passing through the region between the data line and the source pixel electrode is shielded by the second part of the common electrode, so that the black matrix width on the opposed substrate (second substrate) can be reduced more easily.

By disposing the pillar spacer on the black matrix in the part opposed to the source pixel electrode of the second substrate, without deteriorating the aperture ratio, the pillar spacer can be disposed and it is efficient.

In the pixel structure, the entire common electrode potential is generated by ITO film in the uppermost layer. By forming the ITO in the uppermost layer in a matrix, it is connected to the common electrode potential in the periphery. In the sub pixel, there is no electrode connected to the common electrode potential in the other layers. Since an electrode which disturbs improvement in the aperture ratio does not have to be formed, the aperture ratio can be improved.

As a result, the excellent liquid crystal display with high aperture ratio and high transmissivity can be obtained.

Although the mode using no common signal line has been described with reference to FIG. 1, a common signal line 33 may be disposed along the scan line 2 as illustrated in FIG. 3. By making an electrode having common potential extend from the common signal line 33 which is formed in such a manner and overlap with the source pixel electrode, large storage capacitance can be formed. By disposing the common signal line 33, although the aperture ratio slightly deteriorates, the storage capacitance can be increased. Therefore, a highly-durable liquid crystal display device with a wide margin for an inconvenience such as a stain is obtained.

Although the common signal line 33 extends along the scan line 2 in the example of FIG. 3, by making the common signal line 33 extend along the data line and making an electrode extend from the line overlap with the source pixel electrode, storage capacitance can be formed.

Second Embodiment

Figure 5:
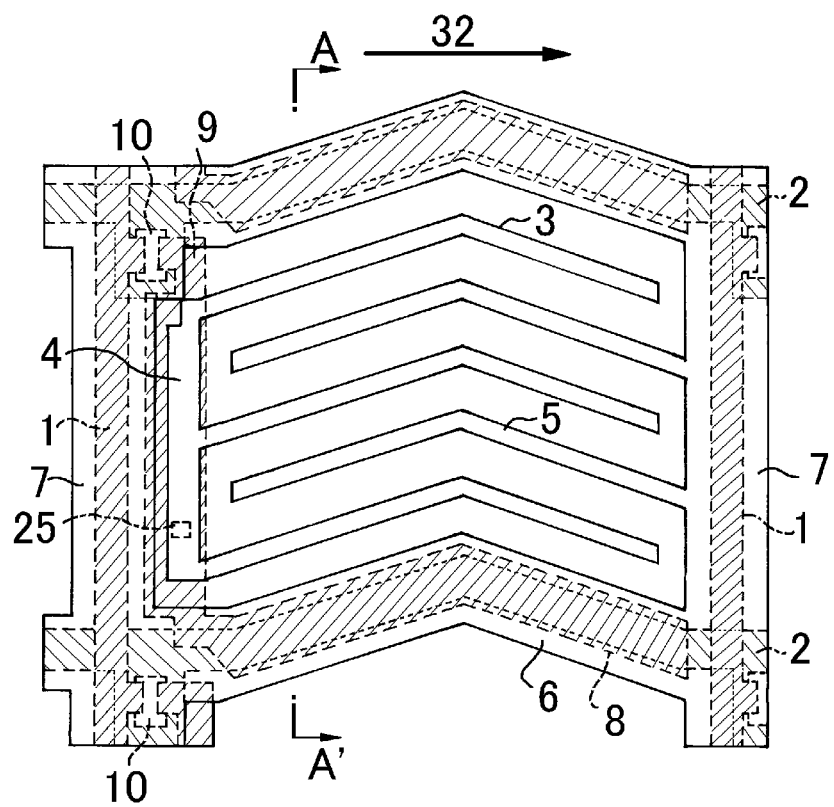
FIG. 5 is a plan view illustrating the configuration of one sub pixel in a liquid crystal display device according to a second embodiment of the present invention.
Figure 6:
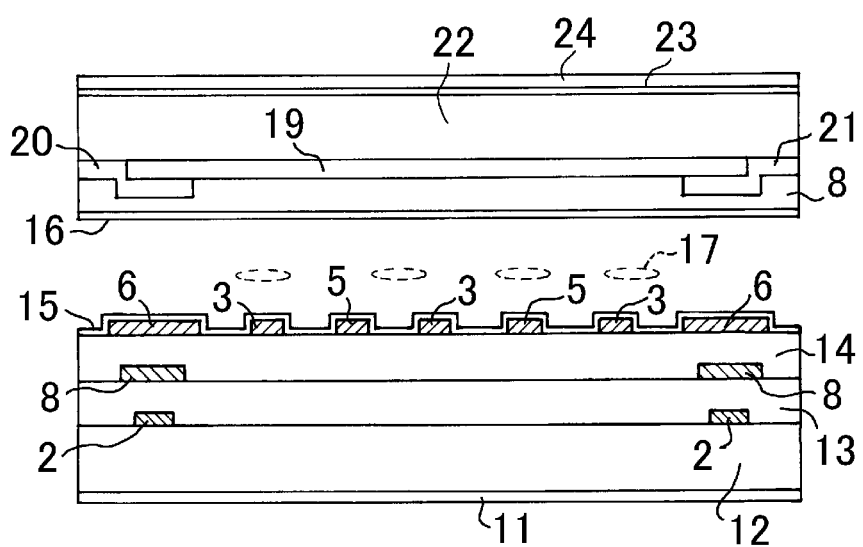
FIG. 6 is a cross section taken along line A-A' in FIG. 5 of the liquid crystal display device according to the second embodiment of the present invention.

FIG. 5 is a plan view illustrating the configuration of one sub pixel in a liquid crystal display device according to a second embodiment of the present invention. FIG. 6 is a cross section taken along line A-A' in FIG. 5.

The pixel of the second embodiment illustrated in FIGS. 5 and 6 will be described in detail in fabricating order.

First, on a glass substrate as the first insulating substrate 12, the scan line 2 is formed by a first metal layer made by 2500 A(Angstrom) of Cr.

As the gate insulating film 13, 5000 A(Angstrom) of SiNx and a thin film semiconductor layer made of 2000 A(Angstrom) of a-Si and 500 A(Angstrom) of n-a-Si are formed. A thin film semiconductor layer 10 is patterned while leaving only a TFT part provided as a switching element of the pixel. By a second metal layer made by 2500 A(Angstrom) of Cr, the data line 1, source/drain electrodes of the TFT, the source pixel electrode 9 connected to the source electrode of the TFT, and a storage capacitance electrode 8 are formed.

Using the source/drain electrodes of the TFT as a mask, n-a-Si in the TFT channel part is removed.

6000 A(Angstrom) of SiNx is formed as the protection insulating film 14, and a through hole 25 for connecting the pixel electrode is formed.

On the protection insulating film 14, a pattern is formed by a transparent electrode made by 800 A(Angstrom) of ITO, which is made of the first part 3 of the pixel electrode (the first part of the pixel electrode), the second part 4 connecting the first parts of the pixel electrodes (the second part of the pixel electrode), the first part 5 of the common electrode (the first part of the common electrode), the second part 7 of the common electrode which shields the data line (the second part of the common electrode), and the third part 6 of the common electrode which shields the scan line (the second part of the common electrode). The pixel electrode made by ITO is connected to the source pixel electrode 9 formed by the second metal layer via the through hole 25 in the second part 4.

A TFT array is formed according to the above-described method.

Subsequently, a method of manufacturing a color filter substrate will be described. On the back face of the second transparent insulating substrate 22, 200 A(Angstrom) of the ITO film 23 is formed. The black matrix 34 is formed on the surface and, after that, a pattern is formed in order of a green (G) layer 19, a red (R) layer 20, and a blue (B) layer 21. Further, the overcoat layer 18 is formed and, on the overcoat layer 18, a pillar spacer 35 is formed.

The alignment films 15 and 16 are formed on the surface of the array substrate and the surface of the color filter substrate fabricated as described above, and rubbing process is performed in the direction of 32. The substrates are adhered to each other, a liquid crystal material is injected in the space between the substrates, and the resultant is sealed. The liquid crystals 17 are aligned in the direction of an initial alignment 32 of the liquid crystals.

Further, on the outer sides of the glass substrates on both sides, the polarizers 11 and 24 are adhered. The direction of the absorption axis of the incident-side polarizer on the TFT array substrate side is matched with the direction of the initial alignment 32 of the liquid crystals.

By providing the liquid crystal display panel fabricated as described above with a backlight and a drive circuit, an active matrix liquid crystal display device of the lateral electric field type of the second embodiment is completed.

The first part 3 of the pixel electrode constructing the comb-shaped electrode, the first part 5 of the common electrode, and the third part 6 of the common electrode shielding the scan line are formed substantially in parallel to one another and are bent in a center part of the pixel. The right half of the first part 3 of the pixel electrode tilts only by θ in the clockwise direction, and the lower part of the left half tilts only by −θ.

Since the scan line 2, the pixel electrodes 3 constructing the comb-shaped electrode extending in the extension direction of the scan line and the common electrode 5 are bent symmetrically with respect to the liquid crystal alignment direction, the electric field in the direction turned from the perpendicular direction (the extension direction of the data line) only by θ in the clockwise direction is applied on the right half side in the diagram of the pixel, and the electric field in the direction turned from the perpendicular direction only by θ in the counterclockwise direction is applied on the left half side in the diagram of the pixel.

By the electric fields, the liquid crystal molecules on the right and left sides of the pixel turn in the opposite directions. The liquid crystal molecules optically compensate with one another, so that a wide view angle characteristic without tone inversion and coloring can be obtained. In the embodiment, θ is set to 15°.

The source pixel electrode 9 made by the second metal layer which is the same as the data line 1 extends along the data line 1 and is connected to the storage capacitance electrode 8 made by the second metal layer formed on the scan lines 2 which are neighboring each other and serving as sides of the sub pixel.

Making the source pixel electrode 9 connected to the source electrode of the thin film transistor extend along the data line 1 forms the source pixel electrode 9 in the short side of the sub pixel, and the length can be reduced the most, so that the area of the part can be minimized. Accordingly, it is possible to improve the aperture ratio.

The storage capacitance electrode 8 made by the second metal layer formed on the scan line 2 generates capacitance between the scan line 2 and itself and functions as a storage capacitor.

The storage capacitance electrode 8 is covered also with the third part 6 of the common electrode, so that storage capacitance is formed also between the storage capacitance electrode 8 and the third part 6 of the common electrode. With the configuration, larger storage capacitance can be formed in small area.

Preferably, the storage capacitance electrode 8 made by the second metal layer is wider than the scan line 2 and covers the scan line 2. In such a manner, the storage capacitance electrode 8 made by the second metal layer has the same potential as that of the pixel electrode 3, and the function of shielding the electric field from the scan line 2. Consequently, the third part 6 of the common electrode shielding the scan line 2 does not have to be so wide.

In the case where there is no storage capacitance electrode 8 made by the second metal layer, the common electrode 6 for shielding the electric field of the scan line 2 has to be projected from the edge of the scan line 2 by 7 μm. By covering the scan line 2 with the storage capacitance electrode 8 made by the second metal layer, the width of the projection can be reduced to 6 μm.

The second part 7 of the common electrode which shields the data line 1 is formed so as to shield the region between the data line 1 and the source pixel electrode 9 made by the second metal layer. Consequently, the liquid crystal is deformed by the electric field applied across the data line 1 and the pixel electrode 3, and a cross talk can be suppressed by light leakage from the deformed part.

The pillar spacer 35 is disposed in a position which is on the black matrix of the sub pixel and is in contact with a part near the source pixel electrode 9 on the array substrate. In such a manner, high aperture ratio can be maintained without exerting influence on the aperture.

Also in the second embodiment, by shielding the region between the data line 1 and the source pixel electrode 9 like in the first embodiment, no electric field is applied to the liquid crystal in the optical path of the oblique visual field 38 as shown in FIG. 2B, so that no light leakage occurs. Consequently, it is sufficient to provide the black matrix only by an amount to cover the separation region between the data line 1 and the source pixel electrode 9 and the pillar spacer along the data line 1.

As described above, by applying the first invention of the present application, light passing through the region between the data line and the source pixel electrode is shielded by the common electrode, so that the black matrix width on the opposed substrate (second substrate) can be reduced more easily.

By disposing the pillar spacer on the source pixel electrode in a manner similar to the first embodiment, the substrate gap can be maintained without increasing the width of the black matrix, and the liquid crystal display device can be formed more compactly.

In the pixel structure, the entire common electrode potential is generated by the ITO film in the uppermost layer. By forming the ITO in the uppermost layer in a matrix, it is connected to the common electrode potential in the periphery. In the sub pixel, there is no electrode connected to the common electrode potential in the other layers. Since an electrode which disturbs improvement in the aperture ratio does not have to be formed, the aperture ratio can be improved.

With such a configuration, without forming an extra electrode which disturbs improvement in the aperture ratio, sufficiently large storage capacitance can be formed in a small area, and the electric field from the scan line 2 and the data line 1 can be sufficiently shielded. Consequently, the excellent liquid crystal display with high aperture ratio and high transmissivity can be obtained.

Figure 7:
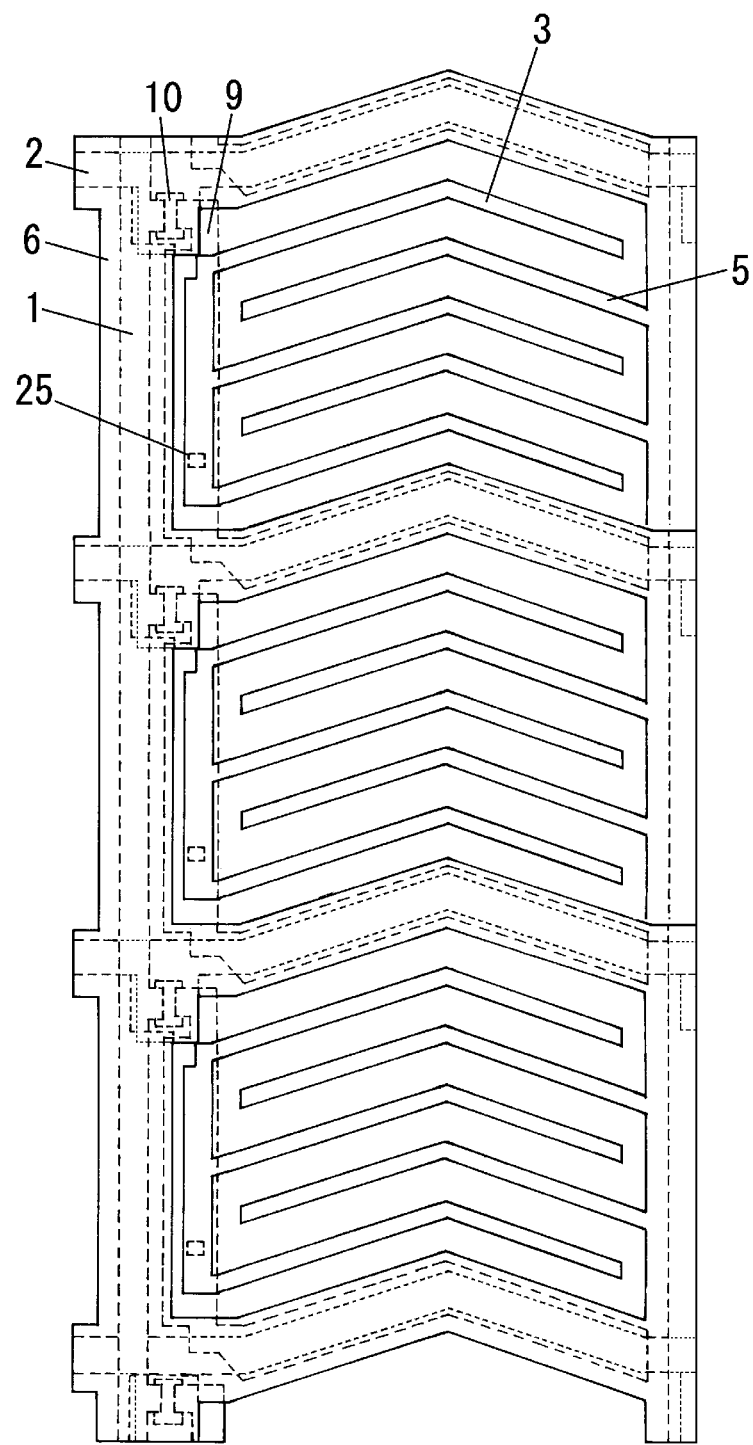
FIG. 7 is a plan view illustrating the configuration of one pixel obtained by arranging, along the data line, three sub pixels of the liquid crystal display device according to the second embodiment of the present invention.
Figure 8:
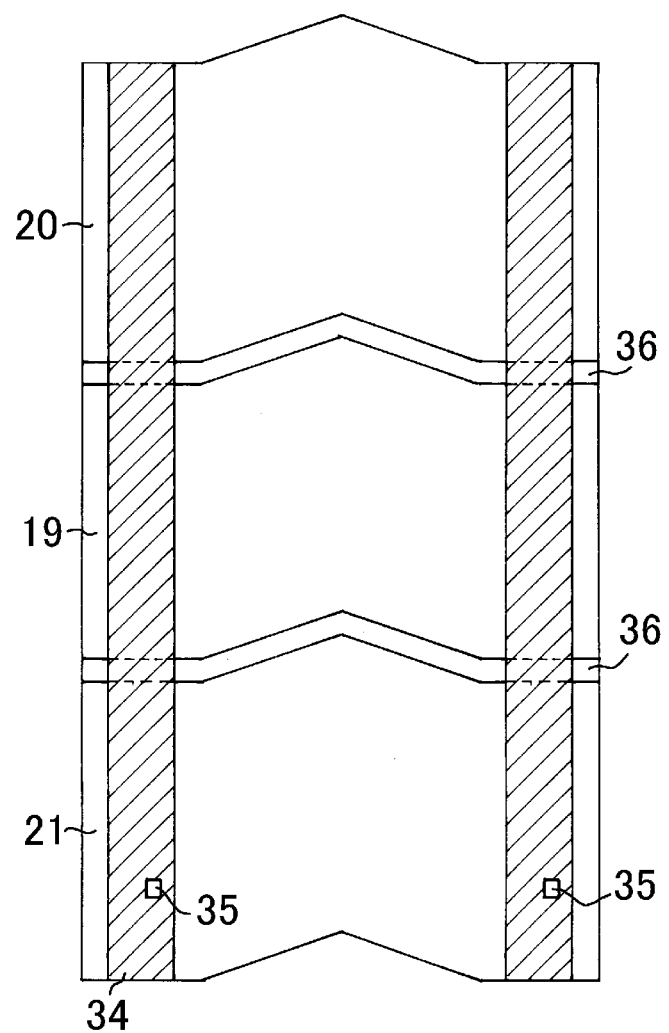
FIG. 8 is a plan view illustrating arrangement of color filters in correspondence with FIG. 7 of the liquid crystal display device according to the second embodiment of the present invention.

FIGS. 7 and 8 illustrate an example of forming one pixel by arranging, along the extension direction of the data line, three sub pixels shown in FIG. 5. The three sub pixels correspond to a color layer 20 of R, a color layer 19 of G, and a color layer 21 of B. Like in the case of disposing the sub pixels of R, G, and B so that they are connected to the same data line, the pixel structure having sub pixels which are horizontally long has high aperture ratio. By connecting the sub pixels of R, G, and B to the same data line, the number of driver ICs for driving the data line can be decreased, and the liquid crystal display device can be fabricated at lower cost.

By disposing the black matrix 34 in the extension direction of the data line, the part near the data line 1 and opposed to the TFT is shielded. As a pattern in which the color layers R, G, and B extend in the extension direction of the scan line 2, at the border of the color layers, a color-overlap shield part 36 is disposed so that the color layers of about 6 μm overlap. Since the part above the scan line 2 is shielded with the storage capacitance electrode 8 made by the second metal layer and the third part 6 of the common electrode formed of ITO, the liquid crystal is not moved by the electric field from the scan line 2. Consequently, it is unnecessary to increase the light shield performance so much. By setting the width of the color-overlap shield part 36 to 6 μm, mixture of colors between the color layers can be prevented and the light shield part does not extend to the opening part. Thus, high transmissivity can be maintained.

Third Embodiment

Figure 9:
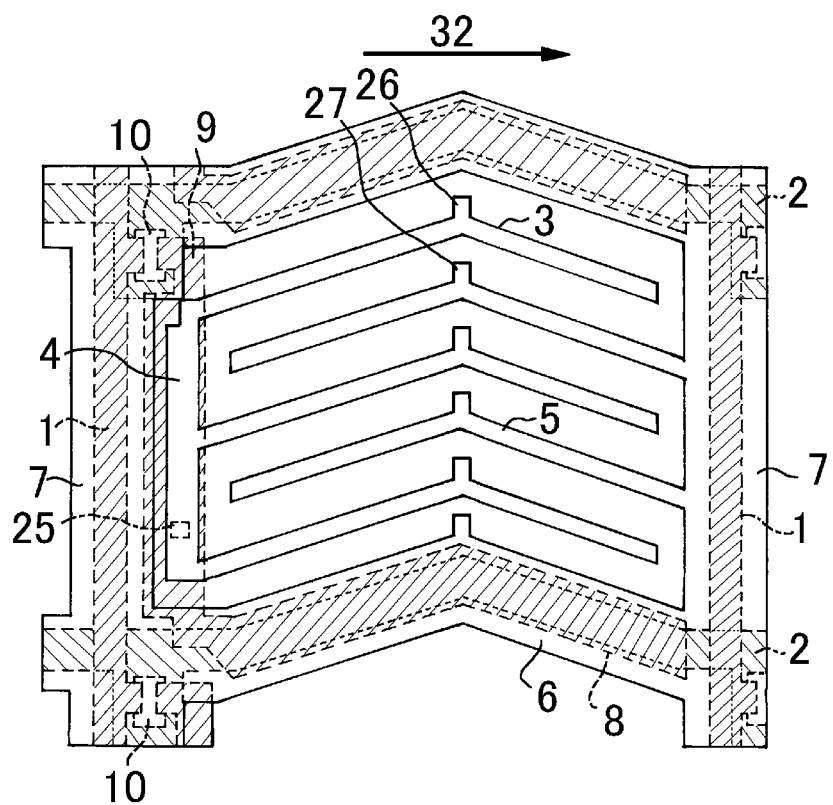
FIG. 9 is a plan view illustrating the configuration of one sub pixel in a liquid crystal display device according to a third embodiment of the present invention.

A third embodiment of the present invention will be described with reference to FIG. 9. FIG. 9 is a plan view illustrating the configuration of one sub pixel in a liquid crystal display device according to a third embodiment of the present invention.

The sub pixel of the third embodiment of the present invention illustrated in FIG. 9 is fabricated by the same manufacturing method as that of the second embodiment. Also in the third embodiment, like in the second embodiment, the first part 3 of the pixel electrode made of ITO and the first part 5 of the common electrode are bent symmetrically with respect to the initial alignment direction 32 of the liquid crystals. In the third embodiment, projection parts 26 and 27 are provided at the bent parts in the pixel electrodes 3 and the common electrodes 5 in the convex direction of the bent parts.

By forming the projection parts as described above, the border of domains which turn in two directions depending on the electric field becomes stable, and an inconvenience such that the domain border becomes unstable due to a finger push and display is disturbed is suppressed. Consequently, the more preferable liquid crystal display device of the lateral electric field type can be provided.

Fourth Embodiment

Figure 10:
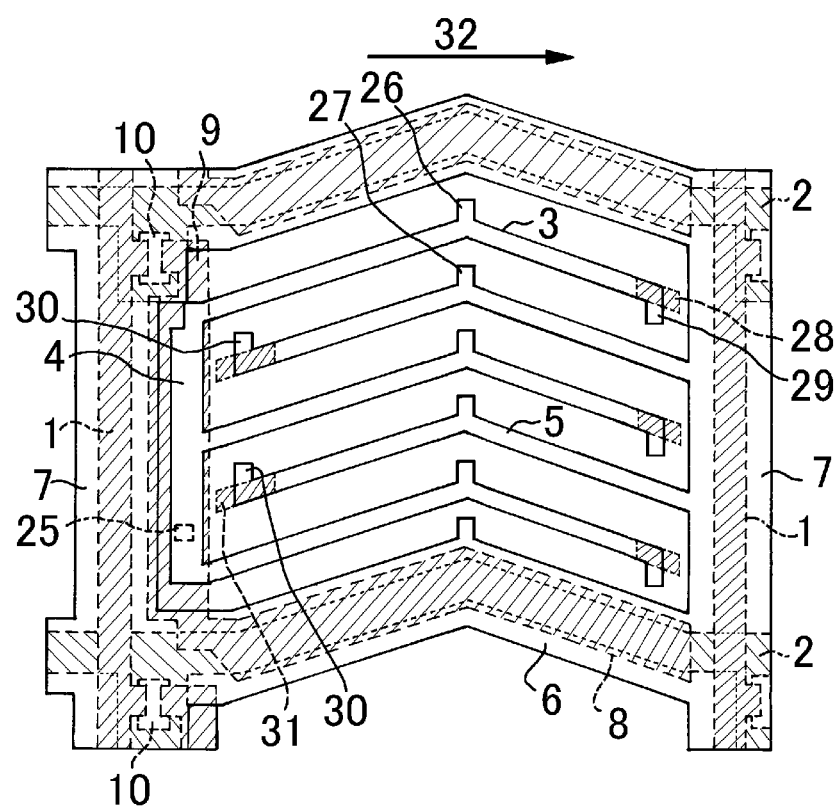
FIG. 10 is a plan view illustrating the configuration of one sub pixel in a liquid crystal display device according to a fourth embodiment of the present invention.

A fourth embodiment of the present invention will be described with reference to FIG. 10. FIG. 10 is a plan view illustrating the configuration of one pixel in the liquid crystal display device according to the fourth embodiment of the present invention.

The difference from the third embodiment of the fourth embodiment is that bent parts 29 and 30 are provided at the tips of the first part 3 of the pixel electrode and the first part 5 of the common electrode, and floating electrodes 28 and 31 formed by the same layer as that of the scan line extend so as to overlap the bent parts 29 and 30 in the extension direction of the comb-shaped electrodes 3 and 5.

With the configuration, inverse rotation of the liquid crystals occurring at the tips of the pixel electrode 3 and the common electrode 5 can be stopped by the bent parts at the tips of the floating electrodes and the teeth of the comb shape. It makes display stable and higher aperture ratio can be realized.

Fifth Embodiment

Figure 11:
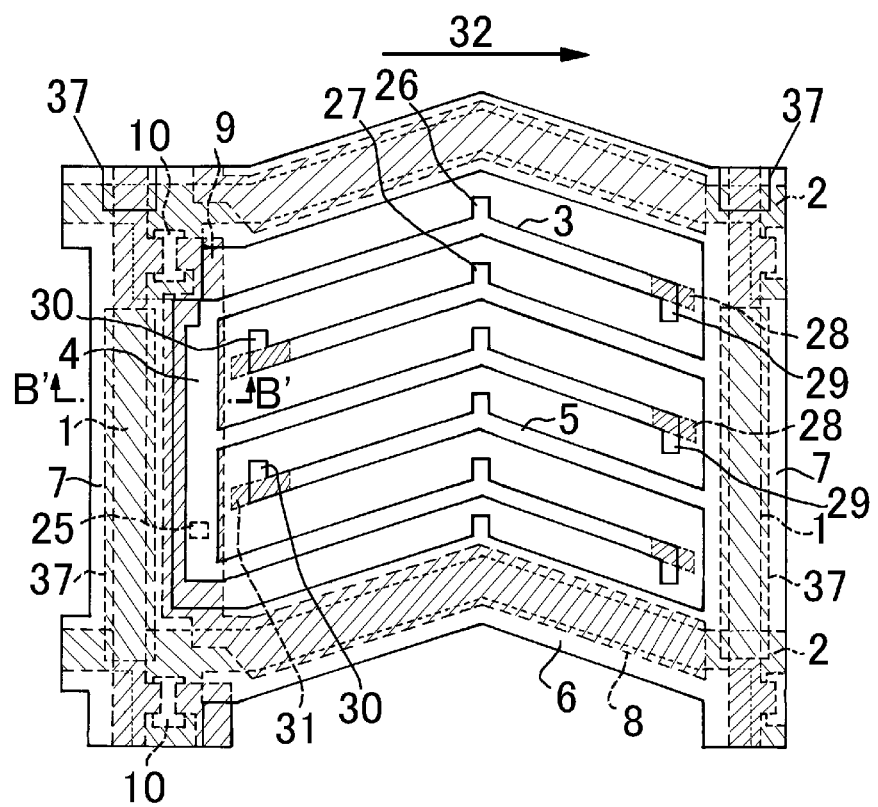
FIG. 11 is a plan view illustrating the configuration of one sub pixel in a liquid crystal display device according to a fifth embodiment of the present invention.

A fifth embodiment of the present invention will be described with reference to FIGS. 11 and 4. FIG. 11 is a plan view of one pixel in a liquid crystal display device according to the fifth embodiment of the present invention. A section taken along line B-B' of FIG. 11 is the same as FIG. 4.

Although the data line 1 is covered with the second part 7 of the common electrode made of ITO while sandwiching only 6000 A(Angstrom) of SiNx as the protection insulating film in the fourth embodiment, in the fifth embodiment, the thickness of the protection insulating film of SiNx is set to 3000 A(Angstrom) and an organic film 37 formed in a convex shape is disposed so as to cover the data line 1.

The convex organic film 37 does not always have to cover the entire data line 1 but may cover a major part of the data line 1 except for a part near the thin film transistor as illustrated in FIG. 11. The thickness of the organic film 37 is set to 0.8 μm.

As a manufacturing method, like in the manufacturing method of the second embodiment, 3000 A(Angstrom) of SiNx is formed as the protection insulating film 14, the through hole 25 connecting the pixel electrode is formed, a photosensitive acrylic resin is applied, exposure and development is performed in a predetermined pattern, and the organic film 37 formed in the convex shape is formed. On the organic film 37, 800 A(Angstrom) of the transparent electrode made of ITO is formed. The other processes are the same as those of the manufacturing method of the first embodiment.

By disposing the convex organic film between the data line 1 and the second part 7 of the common electrode made of ITO and covering the data line 1, the capacitance between the data line 1 and the second part 7 of the common electrode made of ITO can be largely reduced. Consequently, delay in the common electrode in the case where the potential of the data line fluctuates can be reduced. In particular, in the case of high definition, large number of pixels, and large display area, display problems such as crosstalk can be suppressed considerably. Since the thickness of the protection insulating film made of SiNx can be decreased, the load on the plasma CVD for forming the film can be reduced, and the film stress on the substrate can be lessened.

Although photosensitive acrylic resin is used for the convex organic film in the above-described example, a color organic film such as a heat-resistant novolak resin can be used. In this case, the material cost can be decreased. In the case of using the heat-resistant novolak resin, preferably, all of the part is covered with the second part 7 of the common electrode made of ITO so as not to be exposed to chemicals in the following process.

Other organic films can be also used.

Although the thickness of the organic film is set to 0.8 μm in the foregoing embodiment, it can be properly designed in accordance with the circumstances to about 0.5 μm to 2 μm.

Since the organic film 37 provided to reduce the capacitance between the data line 1 and the second part 7 of the common electrode exists only near the data line 1, the capacitance between the scan line 2 and the storage capacitance electrode 8 does not decrease.

Sixth Embodiment

Figure 12:
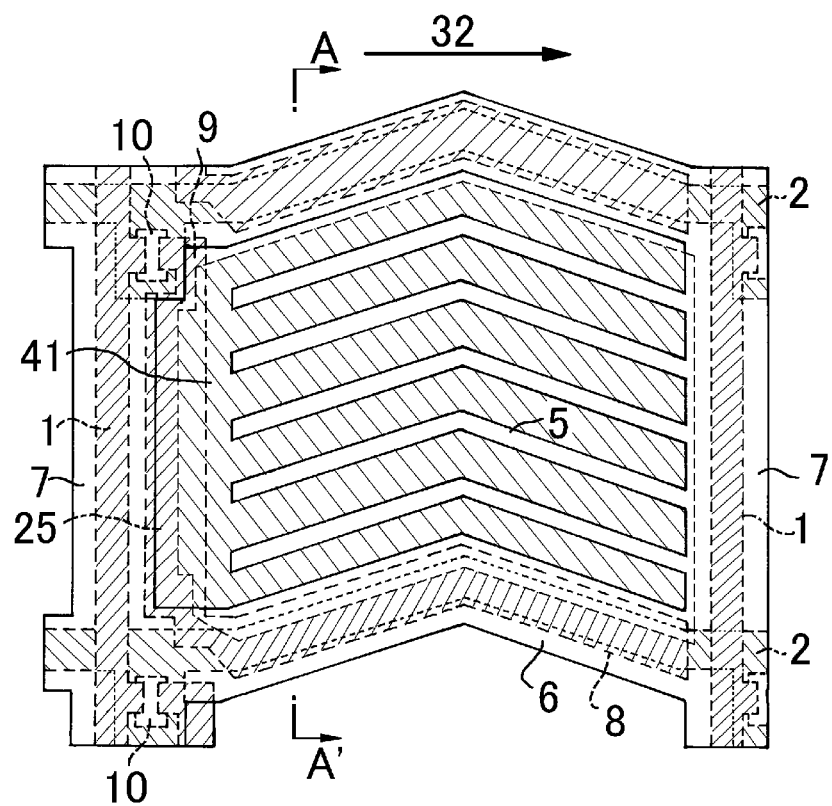
FIG. 12 is a plan view illustrating the configuration of one sub pixel in a liquid crystal display device according to a sixth embodiment of the present invention.
Figure 13:
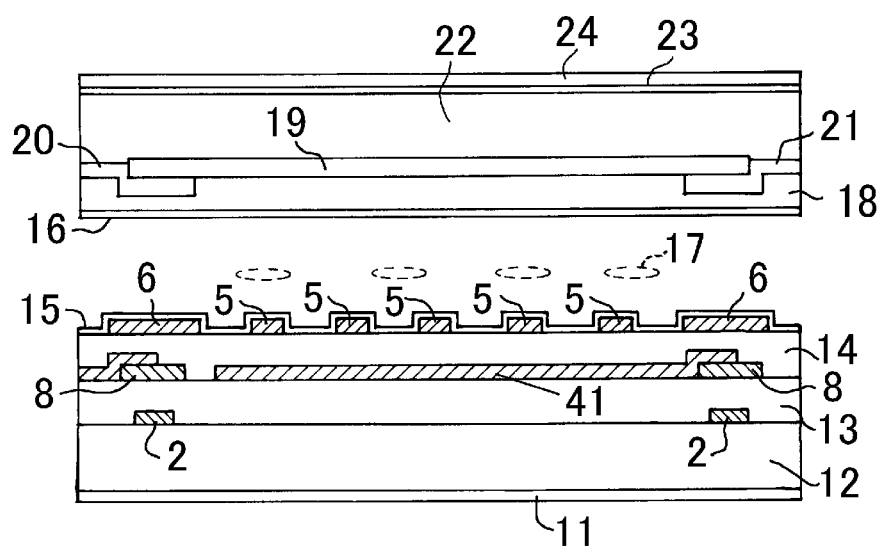
FIG. 13 is a cross section taken along line A-A' of FIG. 12, of the liquid crystal display device according to the sixth embodiment of the present invention.

A sixth embodiment of the present invention will be described with reference to FIGS. 12 and 13. FIG. 12 is a plan view illustrating the configuration of one sub pixel in a liquid crystal display device according to a sixth embodiment of the present invention. FIG. 13 is a cross section taken along line A-A' in FIG. 12.

The pixel of the sixth embodiment illustrated in FIGS. 12 and 13 will be described in detail in fabricating order.

First, on a glass substrate as the first insulating substrate 12, the scan line 2 is formed by a first metal layer made by 2500 A(Angstrom) of Cr.

As the gate insulating film 13, 5000 A(Angstrom) of SiNx and a thin film semiconductor layer made of 2000 A(Angstrom) of a-Si and 500 A(Angstrom) of n-a-Si are formed. The thin film semiconductor layer 10 is patterned while leaving only a TFT part provided as a switching element of the pixel. By a second metal layer made by 2500 A(Angstrom) of Cr, the data line 1, source/drain electrodes of the TFT, the source pixel electrode 9 connected to the source electrode of the TFT, and the storage capacitance electrode 8 are formed.

Using the source/drain electrodes of the TFT as a mask, n-a-Si in the TFT channel part is removed.

Subsequently, a pixel electrode 41 having a plane shape is formed by 800 A(Angstrom) of a transparent electrode made of ITO.

As the protection insulating film 14, 6000 A(Angstrom) of SiNx is formed. The through hole 25 connecting the pixel electrode is formed.

On the protection insulating film 14, a pattern is formed by a transparent electrode made by 800 A(Angstrom) of ITO, which is made of the first part 5 of the common electrode, the third part 6 of the common electrode shielding the scan line, and the second part 7 of the common electrode shielding the data line.

A TFT array is formed according to the above-described method.

Subsequently, a method of manufacturing a color filter substrate will be described. On the back face of the second transparent insulating substrate 22, 200 A(Angstrom) of the ITO film 23 is formed. The black matrix 34 is formed on the surface and, after that, a pattern is formed in order of the green (G) layer 19, the red (R) layer 20, and the blue (B) layer 21. Further, the overcoat layer 18 is formed and, on the overcoat layer 18, the pillar spacer 35 is formed.

The alignment films 15 and 16 are formed on the surface of the array substrate and the surface of the color filter substrate fabricated as described above, and rubbing process is performed in the direction of 32. The substrates are adhered to each other, a liquid crystal material is injected in the space between the substrates, and the resultant is sealed. The liquid crystals 17 are aligned in the direction of the initial alignment 32 of the liquid crystals.

Further, on the outer sides of the glass substrates on both sides, the polarizers 11 and 24 are adhered. The direction of the absorption axis of the incident-side polarizer on the TFT array substrate side is matched with the direction of the initial alignment 32 of the liquid crystals.

By providing the liquid crystal display panel fabricated as described above with a backlight and a drive circuit, an active-matrix liquid crystal display device of the lateral electric field type of the sixth embodiment is completed.

The first part 5 of the common electrode and the third part 6 of the common electrode shielding the scan line are formed substantially in parallel to each other and are bent in a center part of the pixel.

Since the scan lines 2 and the common electrodes 5 constructing the comb-shaped electrode extending in the extension direction of the scan line are bent symmetrically with respect to the liquid crystal alignment direction, across the pixel electrode 41 and the common electrodes 5, a fringe electric field in the direction turned from the perpendicular direction (the extension direction of the data line) only by θ in the clockwise direction is applied on the right half side in the diagram of the pixel, and the electric field in the direction turned from the perpendicular direction only by θ in the counterclockwise direction is applied on the left half side in the diagram of the pixel.

By the electric fields, the liquid crystal molecules on the right and left sides of the pixel turn in the opposite directions. The liquid crystal molecules optically compensate with one another, so that a wide view angle characteristic without tone inversion and coloring can be obtained. In the embodiment, θ is set to 8°.

The source pixel electrode 9 made by the second metal layer which is the same as the data line 1 extends along the data line 1 and is connected to the storage capacitance electrode 8 made by the second metal layer formed on the scan lines 2 which are neighboring each other and serving as sides of the sub pixel.

By making the source pixel electrode 9 connected to the source electrode of the thin film transistor extend along the data line 1, the source pixel electrode 9 is formed in the short side of the sub pixel, and the length can be reduced the most, so that the area of the part can be minimized. It can improve the aperture ratio.

The storage capacitance electrode 8 made by the second metal layer formed on the scan line 2 generates capacitance between the scan line 2 and itself and functions as a storage capacitor.

The storage capacitance electrode 8 is covered also with the third part 6 of the common electrode, so that storage capacitance is formed also between the storage capacitance electrode 8 and the third part 6 of the common electrode. With the configuration, larger storage capacitance can be formed in small area.

Preferably, the storage capacitance electrode 8 made by the second metal layer is wider than the scan line 2 and covers the scan line 2. In such a manner, the storage capacitance electrode 8 made by the second metal layer has the same potential as that of the pixel electrode 41, and the function of shielding the electric field from the scan line 2. Consequently, the third part 6 of the common electrode shielding the scan line 2 does not have to be so wide.

In the case where there is no storage capacitance electrode 8 made by the second metal layer, the common electrode 6 for shielding the electric field of the scan line 2 has to be projected from the edge of the scan line 2 by 7 μm. By covering the scan line 2 with the storage capacitance electrode 8 made by the second metal layer, the width of the projection can be reduced to 6 μm.

The second part 7 of the common electrode which shields the data line 1 is formed so as to shield the region between the data line 1 and the source pixel electrode 9 made by the second metal layer. Consequently, the liquid crystal is deformed by the electric field applied across the data line 1 and the pixel electrode 3, and a cross talk can be suppressed by light leakage from the deformed part.

The pillar spacer 35 is disposed in a position which is on the black matrix of the sub pixel and is in contact with a part near the source pixel electrode 9 on the array substrate. In such a manner, high aperture ratio can be maintained without exerting influence on the aperture.

Since the region between the data line 1 and the source pixel electrode 9 is covered with the third part of the common electrode, no liquid crystal between the data line 1 and the source pixel electrode 9 moves. Consequently, passing light can be suppressed, so that the width of the black matrix can be narrowed, and the aperture ratio can be improved. In this case, it is sufficient to provide the black matrix only by an amount to cover the separation region between the data line 1 and the source pixel electrode 9 and the pillar spacer along the data line 1.

As described above, by applying the fifth invention of the present application, high aperture ratio can be obtained in a sub pixel which is long in the scan line direction.

In the pixel structure, the entire common electrode potential is generated by the ITO film in the uppermost layer. By forming the ITO in the uppermost layer in a matrix, it is connected to the common electrode potential in the periphery. In the sub pixel, there is no electrode connected to the common electrode potential in the other layers. Since an electrode which disturbs improvement in the aperture ratio does not have to be formed, the aperture ratio can be improved.

With such a configuration, without forming an extra electrode which disturbs improvement in the aperture ratio, sufficiently large storage capacitance can be formed in a small area, and the electric field from the scan line 2 and the data line 1 can be sufficiently shielded. Consequently, the excellent liquid crystal display with high aperture ratio and high transmissivity can be obtained.

Seventh Embodiment

Figure 14:
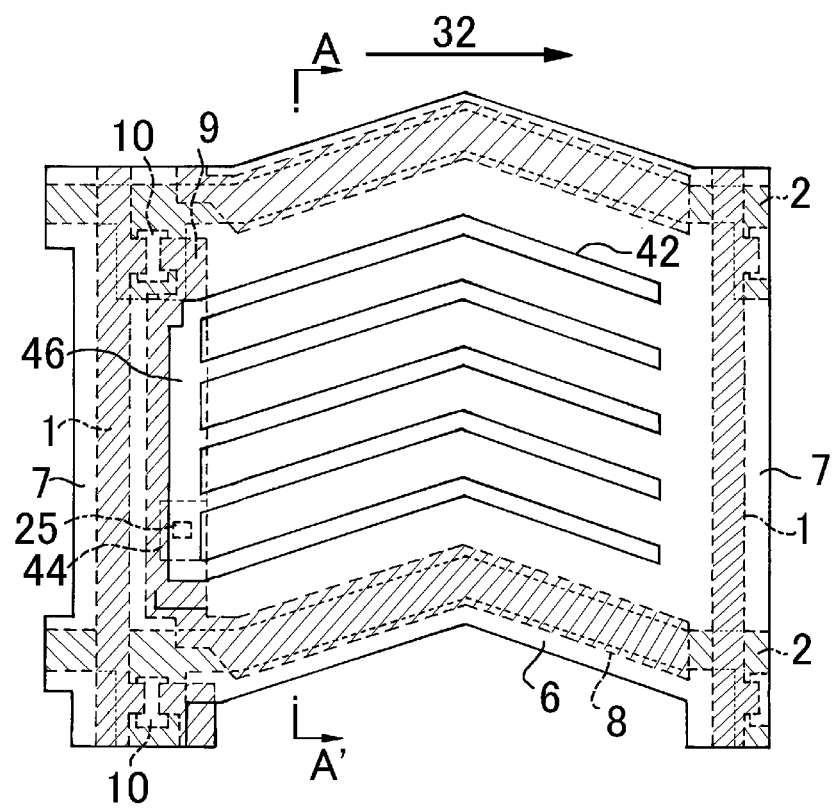
FIG. 14 is a plan view illustrating the configuration of one sub pixel in a liquid crystal display device according to a seventh embodiment of the present invention.
Figure 15:
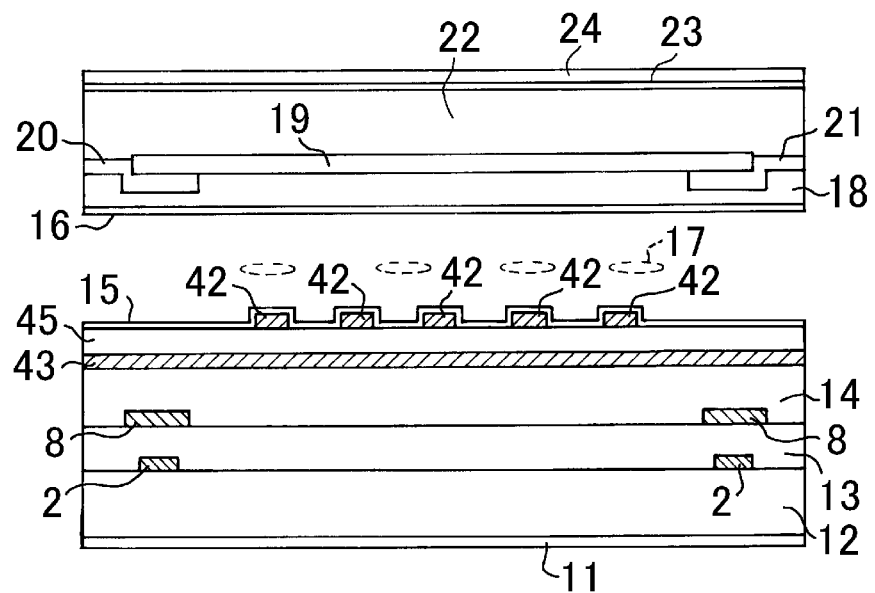
FIG. 15 is a cross section taken along line A-A' of FIG. 14, of the liquid crystal display device according to the seventh embodiment of the present invention.

A seventh embodiment of the present invention will be described with reference to FIGS. 14 and 15. FIG. 14 is a plan view illustrating the configuration of one sub pixel in a liquid crystal display device according to a seventh embodiment of the present invention. FIG. 15 is a cross section of a TFT substrate, taken along line A-A' in FIG. 14.

The pixel of the seventh embodiment illustrated in FIGS. 14 and 15 will be described in detail in fabricating order.

First, on a glass substrate as the first insulating substrate 12, the scan line 2 is formed by a first metal layer made by 2500 A(Angstrom) of Cr.

As the gate insulating film 13, 5000 A(Angstrom) of SiNx and a thin film semiconductor layer made of 2000 A(Angstrom) of a-Si and 500 A(Angstrom) of n-a-Si are formed. The thin film semiconductor layer 10 is patterned while leaving only a TFT part provided as a switching element of the pixel. By a second metal layer made by 2500 A(Angstrom) of Cr, the data line 1, source/drain electrodes of the TFT, the source pixel electrode 9 connected to the source electrode of the TFT, and the storage capacitance electrode 8 are formed.

Using the source/drain electrodes of the TFT as a mask, n-a-Si in the TFT channel part is removed.

As the protection insulating film 14, 6000 A(Angstrom) of SiNx is formed.

On the protection insulating film 14, a pattern made by a plane-shaped common electrode 43, the third part 6 of the common electrode shielding the scan line, and the second part 7 of the common electrode shielding the data line is formed by a transparent electrode made of 800 A(Angstrom) of ITO. In the plane-shaped common electrode 43, a through hole 44 as an opening for connecting a pixel electrode is formed.

As a second protection insulating film 45, 3000 A(Angstrom) of SiNx is formed.

The through hole 25 is formed in the gate insulating film 13, the protection insulating film 14, and the second protection insulating film 45.

Further, on the resultant, a pattern made of the plurality of stripe-shaped pixel electrodes 42 and the second part 46 of the pixel electrode coupling the pixel electrodes 42 is formed by a transparent electrode made of 800 A(Angstrom) of ITO. The pattern is connected to the source pixel electrode 9 via the through holes 25 and 44 in the second part 46 of the pixel electrode.

A TFT array is formed according to the above-described method.

Subsequently, a method of manufacturing a color filter substrate will be described. On the back face of the second transparent insulating substrate 22, 200 A(Angstrom) of the ITO film 23 is formed. The black matrix 34 is formed on the surface and, after that, a pattern is formed in order of the green (G) layer 19, the red (R) layer 20, and the blue (B) layer 21. Further, the overcoat layer 18 is formed and, on the overcoat layer 18, the pillar spacer 35 is formed.

The alignment films 15 and 16 are formed on the surface of the array substrate and the surface of the color filter substrate fabricated as described above, and rubbing process is performed in the direction of 32. The substrates are adhered to each other, a liquid crystal material is injected in the space between the substrates, and the resultant is sealed. The liquid crystals 17 are aligned in the direction of the initial alignment 32 of the liquid crystals.

Further, on the outer sides of the glass substrates on both sides, the polarizers 11 and 24 are adhered. The direction of the absorption axis of the incident-side polarizer on the TFT array substrate side is matched with the direction of the initial alignment 32 of the liquid crystals.

By providing the liquid crystal display panel fabricated as described above with a backlight and a drive circuit, an active-matrix liquid crystal display device of the lateral electric field type of the seventh embodiment is completed.

The first part 5 of the common electrode and the third part 6 of the common electrode shielding the scan line are formed substantially in parallel to each other and are bent in a center part of the pixel.

Since the scan lines 2 and the stripe-shaped pixel electrodes 42 extending in the extension direction of the scan lines 2 are bent symmetrically with respect to the liquid crystal alignment direction, across the stripe-shaped pixel electrodes 42 and the plane-shaped common electrode 43, a fringe electric field in the direction turned from the perpendicular direction (the extension direction of the data line) only by θ in the clockwise direction is applied on the right half side in the diagram of the pixel, and the electric field in the direction turned from the perpendicular direction only by θ in the counterclockwise direction is applied on the left half side in the diagram of the pixel.

By the electric fields, the liquid crystal molecules on the right and left sides of the pixel turn in the opposite directions. The liquid crystal molecules optically compensate with one another, so that a wide view angle characteristic without tone inversion and coloring can be obtained. In the embodiment, θ is set to 8°.

The source pixel electrode 9 made by the second metal layer which is the same as the data line 1 extends along the data line 1 and is connected to the storage capacitance electrode 8 made by the second metal layer formed on the scan lines 2 which are neighboring each other and serving as sides of the sub pixel.

By making the source pixel electrode 9 connected to the source electrode of the thin film transistor extend along the data line 1, the source pixel electrode 9 is formed in the short side of the sub pixel, and the length can be reduced the most, so that the area of the part can be minimized. It can improve the aperture ratio.

The storage capacitance electrode 8 made by the second metal layer formed on the scan line 2 generates capacitance between the scan line 2 and itself and functions as a storage capacitor.

The storage capacitance electrode 8 is covered also with the third part 6 of the common electrode, so that storage capacitance is formed also between the storage capacitance electrode 8 and the third part 6 of the common electrode. With the configuration, larger storage capacitance can be formed in small area.

Preferably, the storage capacitance electrode 8 made by the second metal layer is wider than the scan line 2 and covers the scan line 2. In such a manner, the storage capacitance electrode 8 made by the second metal layer has the same potential as that of the pixel electrode 41, and the function of shielding the electric field from the scan line 2. Consequently, the third part 6 of the common electrode shielding the scan line 2 does not have to be so wide.

In the case where there is no storage capacitance electrode 8 made by the second metal layer, the common electrode 6 for shielding the electric field of the scan line 2 has to be projected from the edge of the scan line 2 by 7 µm. By covering the scan line 2 with the storage capacitance electrode 8 made by the second metal layer, the width of the projection can be reduced to 6 µm.

The second part 7 of the common electrode which shields the data line 1 is formed so as to shield the region between the data line 1 and the source pixel electrode 9 made by the second metal layer. Consequently, the liquid crystal is deformed by the electric field applied across the data line 1 and the pixel electrode 41, and a cross talk can be suppressed by light leakage from the deformed part.

The pillar spacer 35 is disposed in a position which is on the black matrix of a B-sub-pixel and is in contact with a part near the source pixel electrode 9 on the array substrate. In such a manner, high aperture ratio can be maintained without exerting influence on the aperture.

In a manner similar to the first embodiment, the region between the data line 1 and the source pixel electrode 9 is covered with the second part of the common electrode, so that no liquid crystal between the data line 1 and the source pixel electrode 9 moves. Consequently, passing light can be suppressed, so that the width of the black matrix can be narrowed, and the aperture ratio can be improved. In this case, it is sufficient to provide the black matrix only by an amount to cover the separation region between the data line 1 and the source pixel electrode 9 and the pillar spacer along the data line 1.

As described above, by applying the sixth invention of the present application, high aperture ratio can be obtained in a sub pixel which is long in the scan line direction.

In the pixel structure, the entire common electrode potential is generated by the ITO film as a component of the plane-shaped common electrode 43. By forming the common electrode in a matrix, it is connected to the common electrode potential in the periphery. In the sub pixel, there is no electrode connected to the common electrode potential in the other layers. Since an electrode which disturbs improvement in the aperture ratio does not have to be formed, the aperture ratio can be improved.

With such a configuration, without forming an extra electrode which disturbs improvement in the aperture ratio, sufficiently large storage capacitance can be formed in a small area, and the electric field from the scan line 2 and the data line 1 can be sufficiently shielded. Consequently, the excellent liquid crystal display with high aperture ratio and high transmissivity can be obtained.

The present invention can be used for an active-matrix liquid crystal display device of a lateral electric field type and arbitrary equipment using the liquid crystal display device as a display device.

What is claimed is:

1. A liquid crystal display device of a lateral electric field type performing display by rotating horizontal-aligned liquid crystals by a lateral electric field which is applied across a pixel electrode and a common electrode and is substantially parallel to a substrate, the liquid crystal display comprising:
a first substrate having a plurality of data lines disposed in parallel and a plurality of scan lines disposed substantially perpendicular to the data lines and in parallel to one another, and having thin film transistors corresponding to respective sub pixels aligned in a matrix surrounded by the data lines and the scan lines and disposed near intersections between the data lines and the scan lines;
a second substrate opposed to the first substrate via a liquid crystal layer;
an electric potential supply line extending along the data line in the sub pixel region and connected to a source electrode of the thin film transistor;
a pixel electrode disposed in a layer upper than the electric potential supply line in the sub pixel region and connected to the electric potential supply line;
a common electrode formed by a transparent conductive layer having a common electrode first part and a common electrode second part, the common electrode first part being formed in a linear pattern substantially parallel to the scan line and apart from the pixel electrode by a predetermined distance, and the common electrode second part being formed continued to the first part to cover the data line and a separation region between the data line and the electric potential supply line; and
a black matrix formed on the second substrate and disposed to cover the separation region.

2. The liquid crystal display device according to claim 1, wherein a pillar spacer which holds an interval between the first and second substrates is disposed on the second substrate opposed to the electric potential supply line, and
the pillar spacer is disposed on the black matrix of the second substrate.

3. The liquid crystal display device according to claim 1, wherein no electrode connected to the same electric potential as that of the common electrode exists other than a transparent conductive layer as a component of the common electrode in the sub pixel.

4. The liquid crystal display device according to claim 1, wherein the common electrode covers the data line and the separation region, and
an organic film having a convex shape along the data line is provided between the common electrode and the data line.

5. The liquid crystal display device according to claim 1, wherein the electric potential supply line is connected to a storage capacitance electrode formed on a scan line adjacent to the sub pixel.

6. The liquid crystal display device according to claim 5, wherein the storage capacitance electrode is covered with the common electrode.

7. The liquid crystal display device according to claim 1, wherein the pixel electrode and the common electrode are formed substantially parallel to each other, and
a bent part which is bent around a center of a pixel is formed in each of the pixel electrode and the common electrode.

8. The liquid crystal display device according to claim 7, wherein the bent part has a projection part in a convex direction of the bent part.

9. The liquid crystal display device according to claim 8, wherein each of the pixel electrode and the common electrode has a second bent part at a tip part.

* * * * *